United States Patent
Zon et al.

(10) Patent No.: US 11,966,913 B2
(45) Date of Patent: *Apr. 23, 2024

(54) ELECTRONIC TRANSACTION SECURITY SYSTEM AND METHOD

(71) Applicant: Miri Systems, LLC, Charlotte, NC (US)

(72) Inventors: Ludwik F. Zon, Charlotte, NC (US); Ronald W. Sandstrom, Madison, NH (US)

(73) Assignee: MIRI SYSTEMS, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,574

(22) Filed: Jul. 18, 2022

(65) Prior Publication Data

US 2022/0351191 A1 Nov. 3, 2022

Related U.S. Application Data

(63) Continuation of application No. 14/810,214, filed on Jul. 27, 2015, now Pat. No. 11,392,938, which is a continuation of application No. 12/898,595, filed on Oct. 5, 2010, now Pat. No. 9,094,209.

(60) Provisional application No. 61/248,722, filed on Oct. 5, 2009.

(51) Int. Cl.
*H04L 9/00* (2022.01)
*G06Q 20/10* (2012.01)
*G06Q 20/12* (2012.01)
*G06Q 20/38* (2012.01)
*G06Q 20/40* (2012.01)
*H04L 9/32* (2006.01)
*H04W 12/06* (2021.01)
*H04W 12/08* (2021.01)
*H04W 12/61* (2021.01)

(52) U.S. Cl.
CPC ......... *G06Q 20/382* (2013.01); *G06Q 20/108* (2013.01); *G06Q 20/12* (2013.01); *G06Q 20/385* (2013.01); *G06Q 20/401* (2013.01); *G06Q 20/4012* (2013.01); *G06Q 20/4018* (2013.01); *H04L 9/3226* (2013.01); *H04W 12/06* (2013.01); *H04L 2209/56* (2013.01); *H04L 2209/80* (2013.01); *H04L 2209/88* (2013.01); *H04W 12/08* (2013.01); *H04W 12/61* (2021.01)

(58) Field of Classification Search
CPC .......................... G06Q 20/382; G06Q 20/108
USPC ........................................................... 705/44
See application file for complete search history.

(56) References Cited

U.S. PATENT DOCUMENTS

| | | | | |
|---|---|---|---|---|
| 2003/0115154 A1* | 6/2003 | Anderson | ............ | G06Q 20/382 705/73 |
| 2005/0131834 A1* | 6/2005 | Rodriguez | ............. | G06Q 20/04 705/64 |
| 2007/0220007 A1* | 9/2007 | Narita | ...................... | G06F 21/31 707/999.009 |
| 2008/0077807 A1* | 3/2008 | Hicks | ...................... | G06F 21/80 713/193 |
| 2010/0107229 A1* | 4/2010 | Najafi | ................. | H04W 12/069 709/248 |

* cited by examiner

*Primary Examiner* — Christopher J Brown
(74) *Attorney, Agent, or Firm* — Nelson Mullins Riley & Scarborough LLP

(57) ABSTRACT

A system and method for generating a limited use login credential associated with an account maintained by an institution, where the credential facilitates secure access to the account.

26 Claims, 7 Drawing Sheets

ELECTRONIC TRANSACTION SECURITY SYSTEM AND METHOD

CROSS-REFERENCE TO RELATED APPLICATIONS

The present application is a continuation application of U.S. patent application Ser. No. 14/810,214 (now U.S. Pat. No. 11,392,938), filed Jul. 27, 2015, which is a continuation application of U.S. patent application Ser. No. 12/898,595 (now U.S. Pat. No. 9,094,209), filed Oct. 5, 2010, which claims the benefit of U.S. provisional patent application No. 61/248,722, entitled "Electronic Transaction Security System and Method" and filed on Oct. 5, 2009, the entire disclosure of each of which are hereby incorporated by reference as if set forth verbatim herein and relied upon for all purposes.

FIELD OF THE INVENTION

The present invention relates generally to processing of payment card transactions. More particularly, the present invention relates to a system and method to enhance the security of payment card transactions.

BACKGROUND OF THE INVENTION

Payment cards, such as credit cards or debit cards, are commonly used to purchase goods and services in person or over the telephone or Internet. The information required to initiate a payment card transaction typically comprises a payment card number, an expiration date for the payment card, and the cardholder's name. Other information, such as the cardholder's telephone number and address, may be required. Some or all of the information necessary to effect a payment card transaction may potentially become known to a third party, who may use the information without the knowledge or consent of the cardholder.

SUMMARY OF THE INVENTION

The present invention recognizes and addresses the foregoing considerations, and others, of prior art construction and methods.

In this regard, one aspect of the present invention relates to electronic transactions, payment accounts, financial institutions, and security systems for the same. Examples of such subject matter are contained in U.S. copending patent application Ser. No. 12/250,416 (entitled "Electronic Transaction Security System and Method" and filed on Oct. 13, 2008) and Ser. No. 12/713,100 (entitled "Payment System and Method" and filed on Feb. 25, 2010), the entire disclosure of each of which is hereby incorporated by reference as if set forth verbatim herein.

Another aspect of the invention provides a computerized method for generating a time-limited number for use in a payment card transaction involving a payment card issued to a user by a financial institution, wherein the payment card comprises an original payment card number, the method comprising the steps of providing to a processor a first plurality of digits of the original payment card number, where the first plurality of digits are predetermined digits associated to the financial institution, providing to the processor a desired expiration date through which the time-limited number is valid for acceptance in the payment card transaction, and executing a program by the processor so that the program sets a first plurality of digits in the time-limited number to the first plurality of digits in the original payment card number, generates a first number corresponding to the desired expiration date, sets a second plurality of digits in the time-limited number to the first number, and outputs the time-limited number.

According to another aspect, the present invention also provides a method for enhancing the security of a payment card transaction involving a payment card number assigned to a user account by a financial institution, the method comprising the steps of generating a time-limited number comprising a first plurality of digits in the time-limited number set to a first plurality of digits in the payment card number associated to the financial institution and a second plurality of digits in the time-limited number set to a first number corresponding to a desired expiration date, where the time-limited number is not associated with the user account, transmitting the time-limited number and data representative of the user account other than the payment card number to the financial institution, locating the user account based on the data, and validating the time-limited number for the transaction based on the digits indicating the expiration date and the data.

A further aspect of the present invention provides a system for generating a time-limited number for use in a payment card transaction involving a payment card issued to a user by a financial institution, wherein the payment card comprises an original payment card number, the system comprising a processing device and a medium accessible by the processing device comprising instructions when executed by the processing device cause the processing device to perform the steps of setting a first plurality of digits in the time-limited number to a first plurality of digits in the original payment card number, wherein the first plurality of digits of the original payment card number are predetermined digits associated to the financial institution, generating a first number corresponding to a desired expiration date through which the time-limited number is valid for acceptance in the payment card transaction, setting a second plurality of digits in the time-limited number to the first number, and outputting the time-limited number.

In another aspect, there is provided a computerized method for identifying an account assigned to a user by a financial institution, wherein the account is assigned a payment card number, comprising the steps of providing to a processing device information corresponding to a payment card transaction associated with the user, where a portion of the information does not include the payment card number and executing a program by the processing device that locates the account based on the portion of the information that does not include the payment card number.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
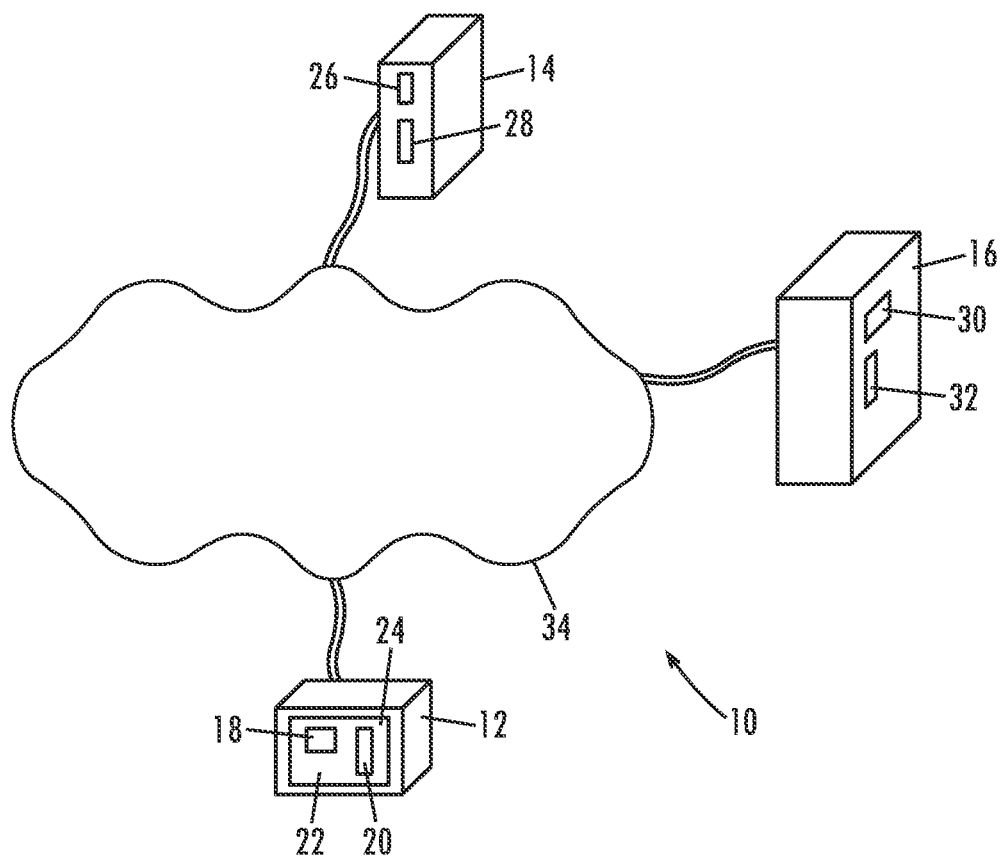
FIG. 1 is a schematic illustration of a system for effecting a payment card transaction in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment.

Generally, a user contacts a financial institution in order to apply for a payment card and provides the institution with information corresponding to the user, such as the user's name, address, and telephone number. In this sense, a payment card may be a credit card, a debit card, or any other card or device by which a user may effect a transfer of credit, cash, or other legal tender to a third party. If the financial institution accepts the user's application, the institution issues the user a payment card bearing a payment card number, a card verification code ("CVC"), and an expiration date. The first six digits of the user's payment card number identify the financial institution that issued the payment card and is referred to as the "BIN" portion of the payment card number. The last digit of the payment card number is reserved as a checksum to ensure the other digits of the number constitute a valid payment card number. The remaining digits between the BIN and the checksum are referred to as the personal account number ("PAN"). Normally, the PAN is a 9 or 8-digit number.

In one preferred embodiment, the financial institution also supplies a 4-digit private identification number ("PIN") to the user. In one embodiment, the financial institution selects the PIN for the user, while, in another embodiment, the user is permitted to select a desired PIN or may select a desired PIN after being issued an initial PIN by the financial institution. The user may select a PIN by telephone, through a web site over the Internet, or other communication mechanism with the financial institution. The financial institution stores all the information corresponding to the user and the associated payment card(s) within its corporate system, such as a Secure Credit Card Account Data Repository. Once the payment card has been issued to the user, it may then be used to initiate a financial transaction between the user and a merchant.

FIG. 1 illustrates a system 10 for effecting an electronic transaction, such as a payment card transaction. System 10 comprises a user device 12, a server 14 maintained by one or more financial institutions, and one or more computers 16 maintained by at least one merchant. User device 12 may be any device that comprises a processing device 18, medium 20, an input device 22, and a display 24 and may comprise, for example, a personal computer, a laptop or tablet computer, a personal data assistant, a cellular phone, or a multimedia player. Medium 20 may be any medium capable of being accessed by processing device 18, such as random access memory ("RAM"), flash memory, a hard drive, a CD, a DVD, or a combination thereof. Input device 22 may be any device by which a user may supply information to device 12, such as a keyboard, a mouse, or, as shown in FIG. 1, a touch screen. In the example shown in FIG. 1, touch screen 22 also functions as display 24, but it should be understood that the two may be separate devices. Server 14 comprises its own processing device 26 and medium 28, while computer 16 comprises a processing device 30 and medium 32 as well. Mediums 28 and 32 may be any medium capable of being accessed by processing devices 26 and 30, respectively, such as RAM, flash memory, hard drives, CDs, DVDs, or any combination thereof.

User device 12, server 14, and computer 16 are connected to one another by a local or distributed network 34, such as the Internet or a telephonic network. Alternatively, user device 12, server 14, and computer 16 may be connected directly over a network, or any combination of private and public networks. Although the connections between user device 12, server 14, and computer 16 to network 34 are illustrated as wired connections in FIG. 1, it should be understood that each device may be connected to network 34 via a wireless system, such as a wireless fidelity ("Wi-Fi") or cellular telephone network.

In the presently-described embodiment, a user directs a web browser program stored on medium 20 and executed by processing device 18 to a website maintained by a merchant and stored on computer 16. The user identifies and selects one or more goods and/or services offered by the merchant via the website (hereinafter "items"). When the user is ready to purchase the items, he supplies the merchant via the website with information necessary to effect a payment card transaction, such as the user's name, telephone number, and the payment card's expiration date and CVC. Instead of supplying the merchant with the user's actual payment card number, however, the user generates an alternate, time-limited number by an encoding process described in more detail below. The user provides the alternate number to the merchant, who submits all the information supplied by the user to sever 14 of the financial institution that is capable of validating the transaction. Upon receipt of the information at sever 14, the financial institution decodes the alternate number as described in more detail below and, using the additional user information, determines whether to validate the payment card transaction. If the financial institution validates the transaction, it sends an indication via server 14 to computer 16 informing the merchant that the transaction has been authorized. The merchant then provides the items to the user.

In another embodiment, the payment card transaction is effected in person or over the telephone such that user and merchant negotiate the details of the transaction in person or via a telephone line. In this embodiment, device 12 generates the alternate, time-limited number by an encoding process described below. The user provides the number to the merchant in any acceptable manner, and the process otherwise continues as described above. It should be understood that it is unnecessary for user device 12 to be connected to network 34 in such an embodiment. A notification of authorization by the financial institution may also be conveyed to the merchant over a telephonic network and may be conveyed verbally as opposed to electronically.

Accordingly, it is also unnecessary for server 14 and computer 16 to be connected via network 34 in such an embodiment.

Figure 2:
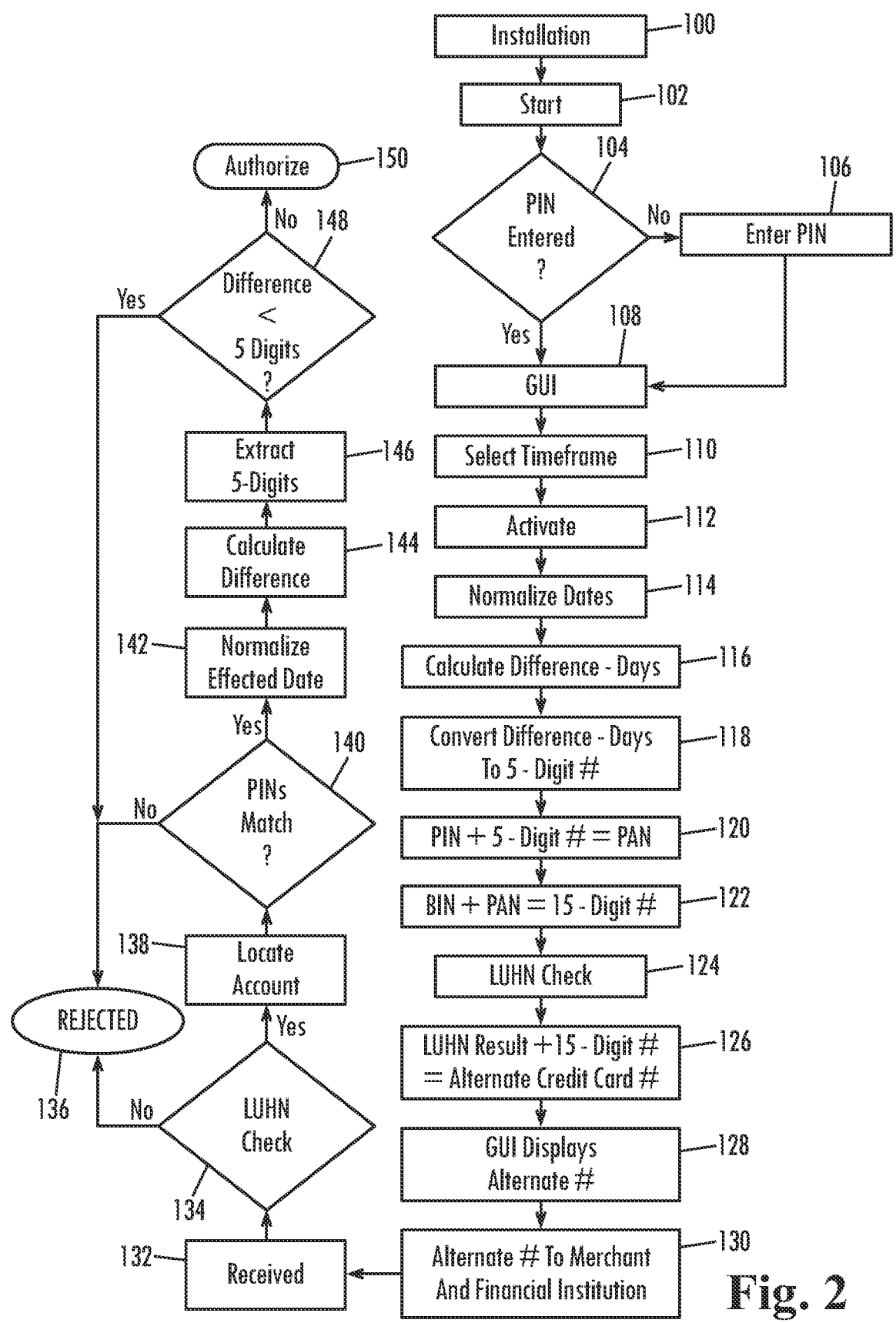
FIG. 2 is a flowchart illustrating a method for encoding and decoding information transmitted to a financial institution in relation to a payment card transaction in accordance with an embodiment of the present invention.

FIG. 2 is a flowchart illustrating an encoding and decoding process referenced above in accordance with an embodiment of the present invention. The process is preferably implemented by software but can also be implemented by hardware, a person, or any combination thereof. In the presently-described embodiment, the software implementing the encoding process is a standalone program stored on medium 20 of user device 12 and executed by processing device 18. Alternatively, the software may be a module imbedded in the user's web browser program, such as an add-on, a plug-in, or an Active-X control. The software implementing the decoding process is a standalone program stored on medium 28 of server 14 and executed by processing device 26. Alternatively, the software may be a module installed within the financial institution's corporate system.

The encoding software is installed on medium 20 of user device 12 at step 100. In a preferred embodiment, user device 12 retrieves the software from server 14. In another embodiment, the user retrieves the software from another server or computer operatively connected to user device 12 or receives the software on a medium, such as a memory device or CD via postal mail from the financial institution or from another entity that has been tasked to maintain the software. During installation, information corresponding to the user's payment card account is stored on medium 20, such as the user's name, telephone number, CVC code, and expiration date. In one embodiment, this information is retrieved from the financial institution during installation of the software. Alternatively, another medium storing this information is provided to user device 12, which transfers or copies the information to medium 20. For example, flash memory containing this information may be inserted into user device 12, or another device proximate to the user device may transmit the information wirelessly to user device 12 via Bluetooth, Wi-Fi, infrared light, or by any other suitable manner. The payment card number, however, is not provided to user device 12 and is not stored on medium 20.

Figure 3:
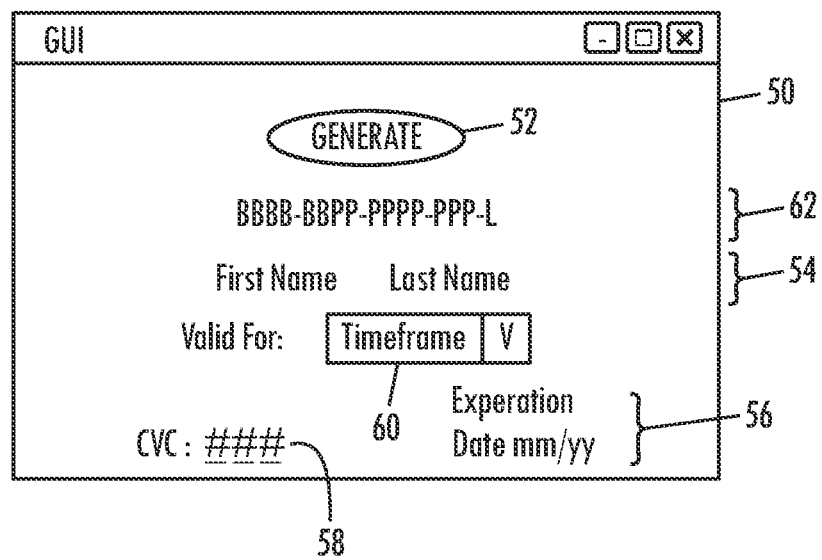
FIG. 3 is an exemplary graphical user interface of the user device of the system shown in FIG. 1.

At step 102, the user initiates the software, which is retrieved from medium 20 and executed by processing device 18. The manner by which the user initiates the software will be dependent upon user device 12, but may generally be initiated by launching the relevant program using the operating system of user device 12. Each time the software starts, the software prompts the user to enter the PIN (via input device 22) supplied by the financial institution or selected by the user in order to gain access to the software, as represented by steps 104 and 106. At step 108, the user is presented with an exemplary graphical user interface ("GUI") 50 as illustrated by FIG. 3. Referring to FIG. 3, GUI 50 comprises an activation button 52 (labeled "GENERATE"), the cardholder's name at a location 54, the expiration date of the actual payment card at a location 56, the CVC for the payment card at a location 58, and a dropdown box 60 providing the user several optional timeframes, such as one week, one month, one year, etc. It should be understood that the timeframes presented by dropdown box 60 may be varied depending on what selections should be available to the user as acceptable timeframes as explained below. For example, the selectable timeframes may include individual days for the week following the time when the user accesses dropdown box 60. A location 62 identifies an alternate, time-limited payment card number generated by the process described below after the user activates button 52. The "B's" of the number at location 62 represent the BIN, which is the same for each alternate, time-limited payment card number in that the BIN identifies the financial institution that issued the original payment card as described above or the financial institution that will validate and/or process transactions involving the generated time-limited numbers. The financial institution may use the same BIN for the time-limited payment cards as it does for the original payment cards, or it may register or use a separate BIN for the time-limited payment cards in order to route transactions involving time-limited payment cards to a specific processing center. The "X's" represent the PAN, and the "L" represents the checksum. The PAN and checksum are generated pursuant to the process described below.

Still referring to FIGS. 2 and 3, at step 110, the user selects a desired timeframe from dropdown box 60 for which the user desires the time-limited payment card number to be valid. At step 112, the user activates button 52, thereby instructing the software to generate a new time-limited payment card number, thus executing the program. At this point, the software normalizes the current date to 00:00:00 Greenwich Mean Time ("GMT") regardless of the current actual time. That is, the software determines the current date and sets the time portion of the current date to 00:00:00 GMT. Based on the timeframe selected by the user at step 110 via dropdown box 60 and the normalized current date, the desired expiration date of the time-limited payment card number is determined at step 114. It should be understood that the expiration date of the time-limited number is defined in terms of GMT in that the expiration time is set to 23:59:59 GMT (approximately midnight) on the date as selected by the user at box 60. For example, if the user selects a timeframe of "1 week" on January 12th at 1 pm Eastern Time, this time is normalized to January 12th at 00:00:00 GMT. Thus, the expiration date is set for January 19th at 23:59:59 GMT. In the presently-described embodiment, the expiration date of the user's payment card is considered to be 23:59:59 GMT as of the date set forth on the original payment card. It should be understood that any time zone and/or desired time may be selected to normalize the current date, desired expiration date of the time-limited number, and the payment card's expiration date, as long as the selected time zone and desired time are used consistently with respect to all three dates so that the three dates are analogous. That is, it is important that the three dates be converted to a common time zone for comparison.

At step 116, the software calculates the number of days between the desired expiration date of the time-limited number and the payment card's expiration date. The number of days between the two is referred to herein as the "difference-days" for purposes of explanation. Since financial institutions generally do not issue payment cards having an expiration date greater than three years from the date of issuance, the value of the difference-days should be less than or equal to 1096 (assuming one of the three years is a leap year; that is, 365*3+1). At step 118, the software determines the number of digits of the difference-days, and zeros are appended to the front of the difference-days until the length of the difference-days is five digits. The result is a 5-digit number representative of the expiration date of the time-limited number relative to the payment card's expiration date (i.e., the number of days before the payment card's expiration at which time the time-limited number will expire).

At step 120, the software appends the 3- or 4-digit PIN entered by the user at step 106 to the front of the 5-digit number established at step 118, resulting in the PAN. It should be understood that the number of digits of the PIN or the number corresponding to the expiration date of the time-limited number may be varied depending on the number of digits available to the encoding process and desired use of the PIN, as set forth in more detail below. The software appends the PAN to the end of the BIN, resulting in a 15-digit number, at step 122. At step 124, a "Luhn check" is performed in order to generate the checksum/last digit of the alternate, time-limited number. A Luhn check, as described in U.S. Pat. No. 2,950,048 issued to H. L. Luhn, which is incorporated by reference herein as if set forth verbatim, should be understood by those of ordinary skill in the art and is not, therefore, described in more detail. At step 126, the software appends the result of the Luhn check to the end of the 15-digit number established at step 122 to create a 16-digit alternate, time-limited payment card number. At step 128, GUI 50 displays the time-limited payment card number at location 62.

As described above with respect to FIG. 1, the user provides the merchant with this alternate, time-limited payment card number to effect a payment card transaction, represented by step 130 in FIG. 2. It should be understood that the user may effect the transaction by providing the alternate, time-limited payment card number to the merchant in a face-to-face transaction or via a telephone. Referring to FIGS. 1 and 2, the merchant transmits the information provided by the user during the user/merchant payment card transaction, including the CVC, expiration date, name, and telephone number associated with the user's payment card, along with the alternate payment card number and the date on which the payment card transaction was effected, to the financial institution associated with the BIN at step 130. In the presently-described embodiment, this information is transmitted to server 14 via computer 16, but may be accomplished by any other means, such as electronically or verbally over a telephone line.

The financial institution receives the information relevant to the payment card transaction from the merchant at step 132. In the current embodiment, software stored on medium 32 and executed by processing device 30 transmits the information to the financial institution. Alternatively, the merchant may provide the information to the financial institution over a telephone line. At step 134, the checksum digit of the alternate payment card number is extracted and compared to the result of a Luhn check of the BIN and PAN to ensure the alternate number may be a valid payment card number. If not, the transaction is rejected at step 136.

Otherwise, the financial institution software uses the other information transmitted by the merchant to the financial institution to locate the user's account, at step 138. The program matches the CVC, name, telephone number, and expiration date transmitted by the merchant to a CVC, name, telephone number, and expiration date associated with an account located within the financial institution's system. In another embodiment, a subset of this information, such as the name and telephone number or the CVC and telephone number, is used to locate the corresponding account maintained by the financial institution. If multiple payment cards are associated to the user or the account, the program uses the CVC and/or expiration date to identify the specific payment card to which the transaction relates.

In another embodiment, user device 12 (FIG. 1) transmits information capable of identifying the user, other than information corresponding to the user's payment card number, along with the time-limited number. The other information could be a device signature, such as a service-subscriber or international mobile subscriber identity ("IMSI"). An IMSI is a unique number associated with user device 12 and is able to uniquely identify the corresponding user within the financial institution's system as long as the IMSI is stored by the institution in the user's account. Alternatively, user device 12 transmits a sequence of alpha-numeric characters unique to the user's account at the financial institution. The financial institution uses this unique sequence, which is stored in the user's account, in order to locate the user's account. It should be understood from the above description that the user's actual payment card number, or the PAN of the actual payment card number, is not required to locate the user's account.

At step 140, the financial institution program extracts the other four digits of the PAN and compares those digits to the PIN stored by the financial institution in the user's account identified at 138. If the extracted digits and the stored PIN do not match, the program rejects the transaction at step 136.

Otherwise, at step 142, the financial institution software normalizes the date on which the payment card transaction was effected to 00:00:00 GMT in a manner identical to that described above with respect to step 114. At step 144, the financial institution software calculates the number of days between the normalized transaction-effected date and the payment card's expiration date. At step 146, the software extracts the last five digits of the PAN of the alternate number and, at step 148, compares the extracted digits to the number of days determined at step 144. If the number of days calculated at step 144 is less than the extracted five digits, this indicates that the alternate, time-limited number has expired. The transaction is thus rejected at step 136. Otherwise, the transaction is authorized at step 150.

It should be understood that the above process allows the creation of an alternate payment card number that is valid for a length of time selected by the user. Thus, if the alternate number is stolen or otherwise becomes public information, the number will automatically be invalidated and unusable after the selected length of time. Additionally, if the information corresponding to the payment card transaction as described above is stolen or otherwise compromised, the possessor of the information is incapable of discerning the user's actual payment card number from the information. The above process allows the user to generate one unique time-limited payment card number for each day that the alternate number is desired to expire.

Figure 4:
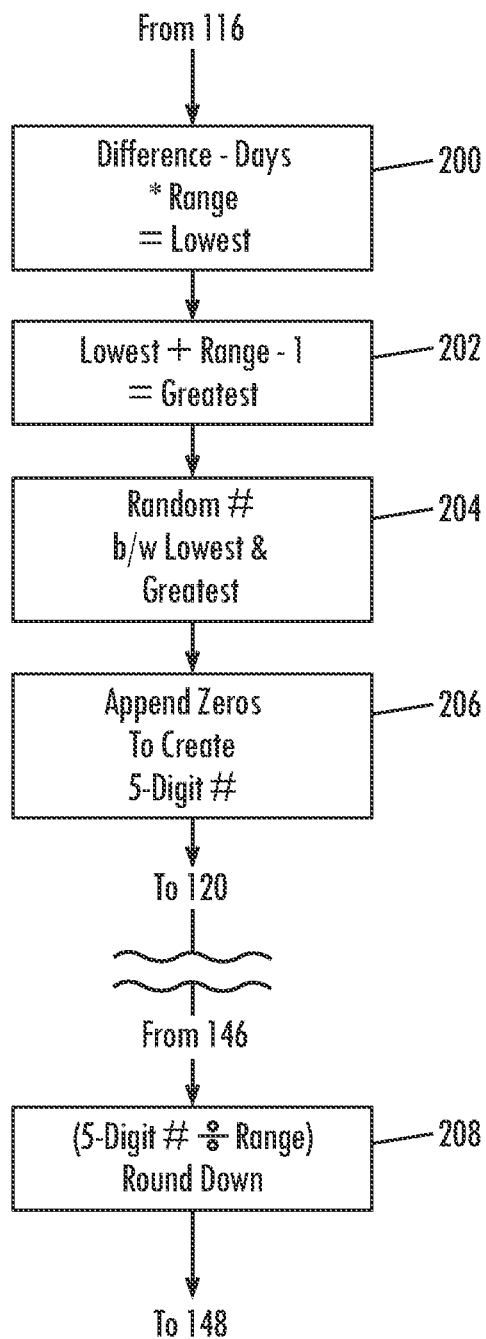
FIGS. 4, 5, 6, and 7 are flowcharts illustrating methods for encoding and decoding information transmitted to a financial institution in relation to a payment card transaction in accordance with additional embodiments of the present invention.

FIG. 4 illustrates an encoding and decoding process in accordance with another embodiment of the present invention. In this embodiment, the user device program uses five digits of the PAN to represent the date on which the alternate, time-limited payment card number will expire, generated in the same manner as described above with respect to the embodiment of FIG. 2. Assuming five digits of the PAN are used for this date number, 100,000 different numbers (0 to 99,999) may be stored in these digits. The greatest amount of time that the user may select for the alternate number to expire coincides with the difference between the card's issue date and its expiration date. Since the expiration date of any payment card is usually three years or less from the date of issuance, the maximum time limit is most likely 1096 days (allowing for a leap year). Accordingly, 91 alternate, time-limited payment card numbers can be generated for each desired expiration date within the 3 years. That is, the 100,000 numbers divided by the 1096 days results in approximately 91 numbers per day. Thus, in the presently-described embodiment, each day within the three years is associated with a range of 91 numbers within the 100,000 available numbers. For example, the payment card's expiration date is associated with the first set of 91 numbers; that is, 0 through 90. The day prior to the payment card's expiration date is associated with the second set of 91 numbers—91 through 180; and so on.

The process illustrated in FIG. 4 is identical to that of FIG. 2 with respect to steps 100 through 116, and the number of days between the normalized, desired expiration date of the time-limited number and the payment card's expiration date is calculated at step 116 as described above with respect to FIG. 2. In the presently-described embodiment with respect to FIG. 4, the number of days determined at step 116 of FIG. 2 is multiplied by the day-range (91, in this case) to thereby find the smallest number within the range associated with the selected, desired expiration date, at step 200. The software adds one less than the length of the day-range slotted for each day (90, in this case) to the smallest number (calculated at step 200) to thereby determine the greatest number within the range, at step 202. A random number generator effected in the user software and bounded by the smallest number (step 200) and greatest number (step 202) within the day-range creates a random number within the range at step 204. As described above, zeros are appended to the random number as necessary, at step 206, to generate a 5-digit number. This 5-digit number corresponds to the expiration date of the time-limited number in that it can be used along with other information associated to the actual payment card to determine the expiration date of the time-limited number. This number is appended to the PIN to form the PAN. The above process replaces the process described above with respect to step 118 of FIG. 2, and process flow proceeds to step 146 and continues in a manner identical to the process described above with respect to FIG. 2.

Still referring to FIG. 4, the financial institution program extracts the five digits representing the desired expiration date, at step 146. The financial institution program divides the extracted number by the day-range of numbers for each expiration date (91 in the presently described example) and rounds down to the nearest whole number or integer, at step 208. The result is the number of days between the desired expiration date of the alternate number and the payment card's expiration date. Process flow proceeds to step 148 and continues in a manner identical to that described above with respect to FIG. 2.

The process described above with respect to FIG. 4 provides the ability to generate multiple time-limited payment card numbers for each desired expiration date. Thus, for example, if the user generates multiple numbers for respective transactions, the system likely generates different numbers for most or all of the transactions. If one of the numbers is stolen, it may therefore be possible to identify the particular transaction involved, and thereby the particular vendor repository from which the number was stolen. It is also possible to generate additional time-limited numbers for a specific timeframe even after one such number becomes compromised.

Figure 5:
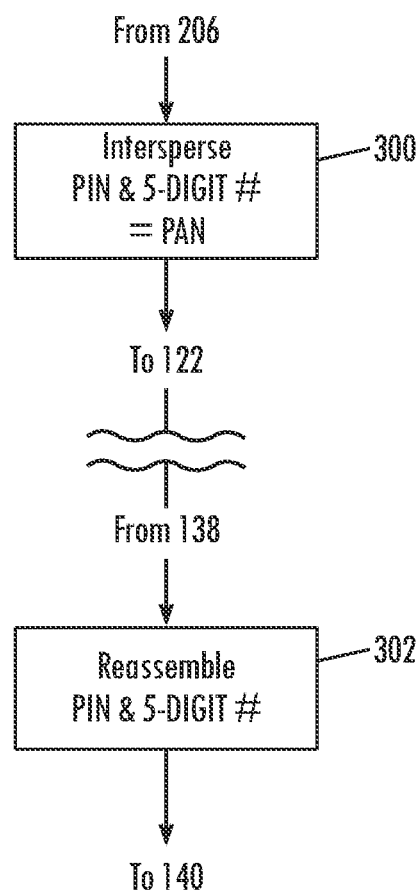

FIG. 5 illustrates an encoding and decoding process in accordance with another embodiment of the present invention. In this embodiment, process flow proceeds to step 206 in a manner identical to that described above with respect to FIG. 4. Step 120 (FIG. 4) is replaced by step 300 where the user program on device 12 creates the PAN by interspersing the PIN and the 5-digit number generated at step 206. For example, each digit of the PIN is inserted between two adjacent digits of the 5-digit number. It should be understood that the manner by which the PIN and the 5-digit number are interspersed or rearranged can vary as long as the financial institution reassembles the PIN and the 5-digit number using a corresponding method, as described below. Moreover, the method of interspersion can vary from one user to another.

Process flow continues to step 138 in a manner identical to that described above with respect to FIG. 4. At step 302, the financial institution program reassembles the PIN and the 5-digit number from the PAN in reverse of the manner by which the PIN and 5-digit number were interspersed at step 300. Continuing the example above, for instance, each digit of the PIN would be extracted from between the adjacent digits of the 5-digit number where they had been inserted. Process flow proceeds to step 140 and then continues in a manner identical to that described above with respect to FIG. 4. It should be understood that the above process intersperses the PIN associated with the user's payment card in order to obscure the PIN's visibility.

Figure 6:
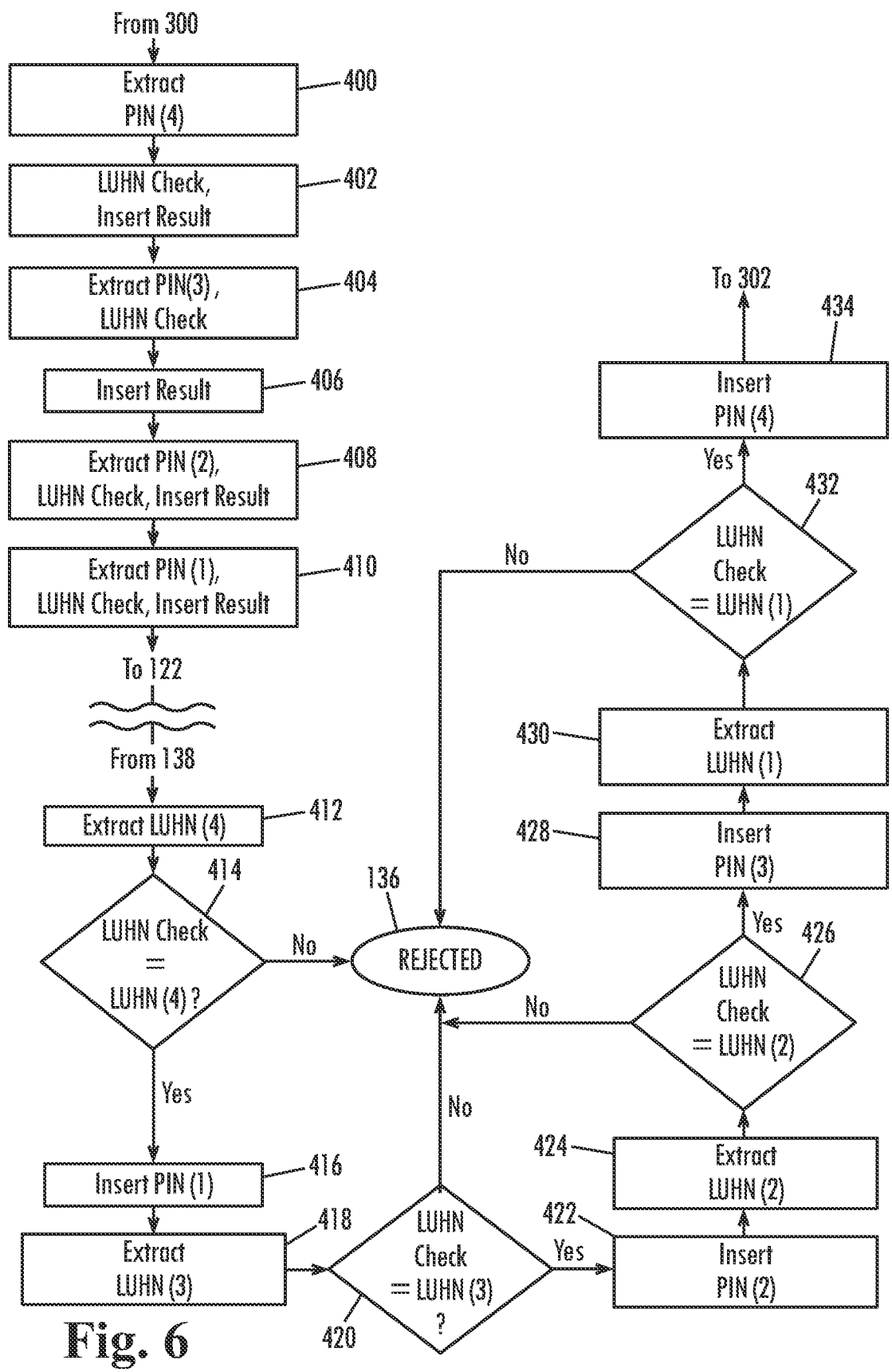

FIG. 6 illustrates another encoding and decoding process in accordance with another embodiment of the present invention. In this embodiment, process flow proceeds to step 300 in a manner identical to that described above with respect to FIG. 5. Because the user program is constructed to remember the location at which it inserted the digits of the PIN into the positions within the PAN, the user program extracts the last digit of the PIN, regardless of its location within the PAN at step 400. At step 402, the user program performs a Luhn check on the remaining 15 digits of the number and places the result in the location where the last digit of the PIN was extracted. At step 404, the user program extracts the third digit of the PIN and performs a Luhn check on the remaining 15 digits of the number. At step 406, the user program places the result of the Luhn check in the location where the third digit of the PIN was extracted. At step 408, the program extracts the second digit of the PIN and replaces it with the result of a Luhn check on the remaining 15 digits. At step 410, the program extracts the first digit of the PIN and replaces it with the result of a Luhn check on the remaining 15 digits. Process flow continues to step 138 in a manner identical to that described above with respect to FIG. 5.

The financial institution program is constructed to know the locations where the user program inserted the digits of the PIN into the PAN, and, thus, the locations where the Luhn checks replaced the digits of the PIN within the PAN. Thus, at step 412, the financial institution program extracts the number that replaced the first digit of the PIN and performs a Luhn check at step 414. If the result is anything other than the number extracted at step 412, the transaction is denied at step 136. Otherwise, at step 416, the financial institution program places the first digit of the PIN as stored in the user's account maintained by the financial institution in the location where the number was extracted at step 412. At step 418, the financial institution program extracts the number that replaced the second digit of the PIN and performs a Luhn check at step 420. If the result is anything other than the number extracted at step 418, the transaction is rejected at step 136. Otherwise, at step 422, the program places the second digit of the PIN as stored by the financial institution in the location where the number was extracted at step 418.

The financial institution program extracts the number that replaced the third digit of the PIN at step 424 and performs a Luhn check at step 426. If the result is anything other than the number extracted at step 424, the transaction is denied at step 136. Otherwise, at step 428, the financial institution program inserts the third digit of the PIN as stored in the user's account maintained by the financial institution into the PAN at the location where the number was extracted at step 424. At step 430, the financial institution program extracts the number that replaced the fourth digit of the PIN and performs a Luhn check at step 432. If the result is anything other than the number extracted at step 430, the transaction is denied at step 136. Otherwise, at step 434, the financial institution program places the fourth digit of the PIN as stored by the financial institution in the location where the number was extracted at step 430. Process flow proceeds to step 302 and continues in manner identical to that described above with respect to FIG. 5.

It should be understood that the above process changes each digit of the PIN, which is stored at different locations within the PAN of the time-limited payment card number. Additionally, the alteration of each digit is dependent on the other digits and the prior changes. Accordingly, if an attempt to use the time-limited payment card number involves changing any of the digits, the transaction will be denied. Moreover, the PIN is not visible within the PAN.

Figure 7:
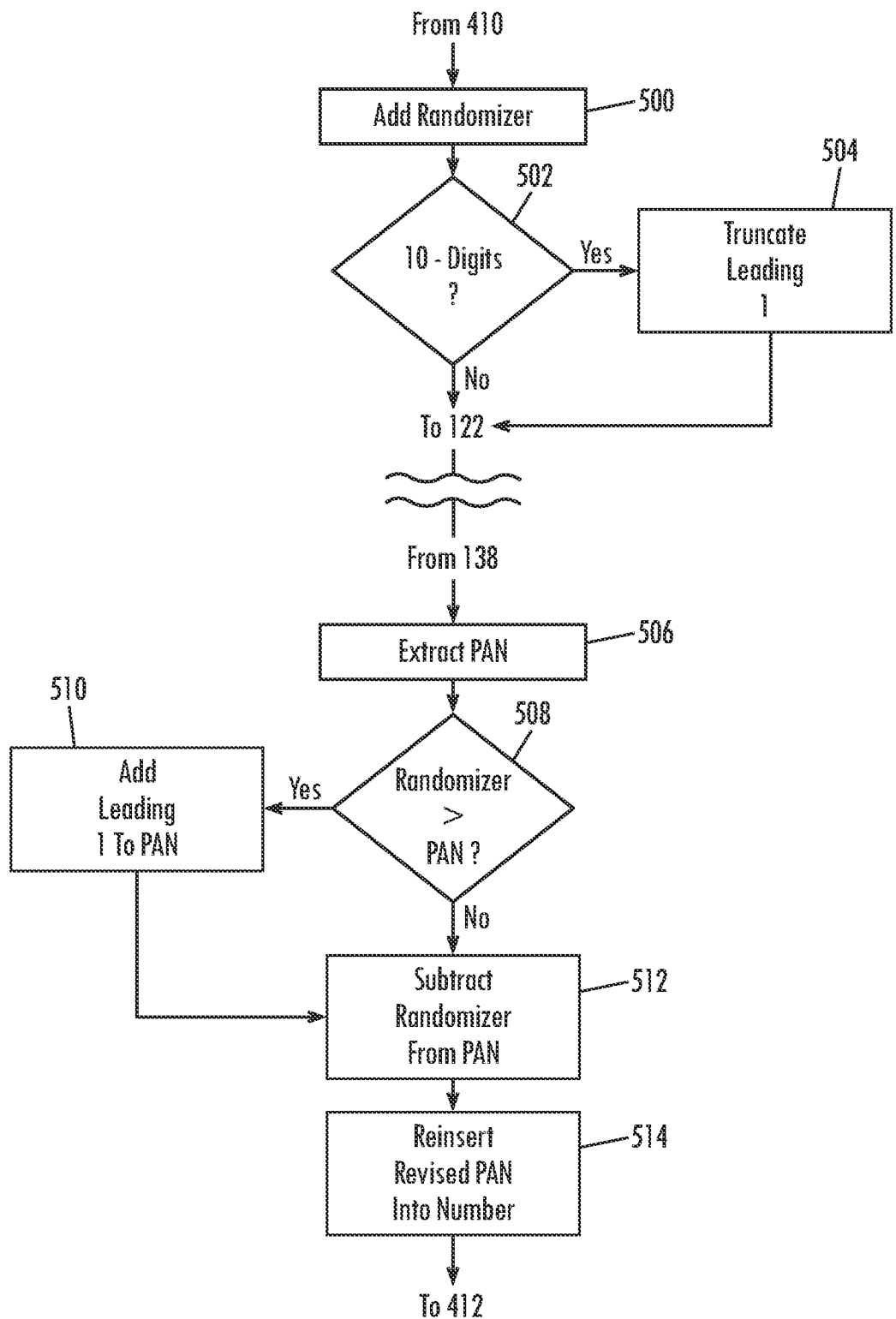

FIG. 7 illustrates an encoding and decoding process in accordance with another embodiment of the present invention, in which the information stored on user device 12 (FIG. 1) includes an eight digit random number specific to the user (referred to hereinafter as the "randomizer" for simplicity). The financial institution stores the randomizer in the user's account.

Referring to FIG. 7, installation at step 100 occurs in the same manner as described above with respect to FIG. 2. Process flow proceeds from step 100 to step 410 in a manner identical to that described above with respect to FIG. 6. At step 500, the user program adds (sums) the randomizer to the PAN generated at step 410. At step 502, the user program analyzes the length of the summation calculated at step 500. If the summation is a ten digit number, the leading "1" is truncated, resulting in a 9-digit PAN. Process flow proceeds to step 140, as it also would if the summation was not a 10-digit number (determined at step 500), and continues in a manner identical to that described above with respect to FIG. 6.

At step 506, the financial institution program extracts the PAN from the time-limited number. At step 508, the financial institution program compares the randomizer associated with the user's payment card stored by the financial institution to the 9-digit PAN. If the randomizer is greater than the PAN, a leading "1" is appended to the front of the PAN at step 510. The financial institution program subtracts the randomizer from the PAN at step 512. The program reinserts the resulting 9-digit PAN into the time-limited payment card number in the appropriate location—between the BIN and the checksum. Process flow proceeds to step 412 and continues in a manner identical to that described above with respect to FIG. 6.

The process described above with respect to FIG. 7 includes the addition of a random number specific to the user. This number is stored on the user's device 12 and the financial institution's server 14. Any attempt to decode the time-limited payment card number generated by the above process without the randomizer will be unsuccessful.

With reference to FIG. 7, in another embodiment, the information stored on user device 12 (FIG. 1) includes two digits of a 4-digit validation number and six digits of the 8-digit randomizer. As set forth above, the financial institution maintains all the information corresponding to the user, including all four digits of the validation number and all eight digits of the randomizer.

The PIN entered by the user at step 106 is comprised of the other two digits of the 4-digit validation number and the other two digits of the 8-digit randomizer. It should be understood that the location of the remaining digits of the validation and randomizer number within the PIN may vary, provided that the software is constructed to know the location of each digit. For example, the two digits of the validation number may be the first two digits of the PIN or the middle two digits, with the remaining two locations being occupied by the two missing digits of the randomizer. The digits may also be reversed with respect to how they should appear in the validation number and randomizer. For example, the last digit of the PIN may be the first digit of the complete validation number, and the first digit of the PIN may be the third digit of the complete validation number. Thus, it should be apparent that the location of each digit within the PIN is inconsequential on the condition that the software is constructed to identify the location of each digit.

In the present embodiment, the two digits of the validation number are extracted from the PIN entered by the user and joined to the two digits of the validation number within the file stored on medium 20 to produce the complete validation number at step 106. Similarly, the user program extracts the two digits of the randomizer number from the PIN and joins them to the six digits of the randomizer within the file stored on medium 20 to produce the complete randomizer at step 106. In the presently-described embodiment, the validation number replaces the PIN number for the remainder of the process, which proceeds to step 108 and continues in a manner otherwise identical to that described above. For example, the validation number (instead of the PIN) and the 5-digit number are interspersed at step 300 and reassembled at step 302. Process flow proceeds in a manner similar to that described above.

At step 148, the financial institution program compares the reassembled validation number to the validation number specific to the user maintained by the financial institution. If the validation numbers do not match, the transaction is denied at step 136. Otherwise, the transaction is validated at step 150.

The process described above prevents the information necessary to generate a time-limited payment card number from being accessible from a single location. That is, other than the financial institution, no entity or device possesses the entire validation number and/or randomizer, not even the user. Thus, if user device 12 is stolen, the culprit should be unable to generate a valid number without knowing the PIN.

It should also be understood that the encoding and decoding processes described above are exemplary processes, and various processes may be used. Moreover, different processes can be used for one or more users so that the encoding and decoding process for one user may be different from the process for another user. As a result, the security of the above-described system and method is increased because discovery of the method associated with one user would be ineffective in compromising the confidential information of another user to which a different method has been associated.

Referring to FIGS. 1 and 7, in another embodiment, a file containing the information corresponding to the user's payment card, along with the two digits of the validation number and the six digits of the randomizer, is stored on medium 20 during installation at step 100. Alternatively, the file may be stored on medium 20 prior to or subsequent of the installation of the software at step 100. The file may be downloaded from server 14 or from another computer maintained by a third-party operatively connected to user device 12, or may even be mailed via postal mail to the user by the financial institution or third-party.

It should be understood that the number of digits apportioned to the validation number/PIN and to the number representative of the desired expiration date of the time-limited payment card number may be varied depending on the available number of digits and the desired use of the digits without departing from the scope of the presently-described embodiments. For example, credit cards issued by American Express are 15 digits in length, as compared to the 16-digit numbers discussed above. To accommodate for one less digit, a digit can be removed from either the digits allotted to the validation number/PIN or to the portion representative of the desired expiration date. Reducing the number of digits allotted to the desired expiration date changes the number of available time-limited credit card numbers per desired expiration day. For instance, reducing the number of digits for the number representative of the desired expiration from five to four reduces the number of different time-limited numbers that can be generated for each day from 91 to 9 (10,000÷1096). Furthermore, financial institutions associated with a specific BIN may authorize other financial institutions to use the same BIN. In this scenario, digits in the PAN following the BIN are used to identify which payment card numbers have been issued by the authorized institutions. Transactions involving payment card numbers that include the specific BIN are routed to the authorizing institution. The authorizing institution then routes the transactions to the authorized institution associated with the digits in the PAN set aside to uniquely identify the authorized institutions to which the relevant payment card number corresponds. In this case, digits within the PAN available for use in the processes described above are reduced. The encoding and decoding process handles a reduced amount of available digits within the PAN as described above.

Furthermore, it may be desirable to allot more available, time-limited payment card numbers to one desired expiration date than to another. For instance, assuming five digits of the PAN are selected to represent the desired expiration date of the time-limited payment card number as described above, it may be desirable to allot half of the available numbers, or 50,000, to be used for time-limited numbers expiring on the same date as the actual payment card's expiration date. In this case, only the remaining 50,000 numbers are available for other expiration dates, thereby reducing the available numbers per desired expiration day to approximately 45 (50,000÷(1096−1)).

Similarly, it may be desirable to allow a set of time-limited numbers for a specific use. For example, it may be advantageous to allocate 50,000 of the available numbers to be used as single-use payment card numbers. That is, each generated number based on one of these available numbers may be used once only. In such an embodiment, the user does not select a timeframe or an expiration date. Instead, the encoding program generates a time-limited number by randomly selecting a number from the available range of numbers. The process otherwise proceeds as described above. Once the random number is decoded and extracted from the time-limited number, the decoding program determines if it falls within the range of acceptable numbers and, if so, whether the number has been previously used. If the number has not been involved in a previous transaction, the financial institution authorizes the current transaction and removes the number from the list of useable numbers. Otherwise, the transaction is rejected. Thus, if another transaction includes the same number from the range of acceptable numbers, it will be rejected. This prevents a stolen or compromised, alternate number from being used again once it has been used in a transaction.

In addition, the length of the PIN issued by the financial institution may be varied without departing from the scope of the present invention. Furthermore, the purpose of each digit within the PIN may be varied depending on the desired encoding and decoding process. For example, the financial institution may issue a 5-digit PIN, wherein one of the digits is part of the validation number and the remaining four digits are part of the randomizer. In this instance, three digits of the validation number are stored on medium 20 of user device 12, and four digits of the randomizer are stored on the medium.

It should also be understood that the present invention is not directed solely to transactions occurring over a network, such as the Internet. For example, a user may contact a merchant by telephone and provide the information necessary to effect a payment card transaction, including the alternate, time-limited payment card number, over the phone. In this instance, user device 12 generates the number in the manner described above, and the user verbally provides the number and other necessary information to the merchant. Moreover, a user also can verbally provide the time-limited number in a face-to-face transaction with a merchant. At this time, the user also provides the merchant with other information necessary to effect a payment card transaction, which may include the user's name, CVC, and telephone number. Thus, it should be understood that the processes described above may be employed in both a connected and disconnected manner. That is, user device 12 (FIG. 1) may be a personal computer operatively connected to a merchant and a financial institution via a physical network in a manner that allows the user device to interact with systems maintained by the merchant and/or financial institution. Alternatively, user device 12 may be a personal data assistant that is not connected to a system maintained by the merchant or financial institution. In such an embodiment, information stored within or generated by the user device may be provided to the merchant or financial institution by the user, the merchant, or by any other suitable manner.

It should be understood that user device 12 (FIG. 1) need not be an interactive device, but can be a non-interactive device, such as a smart pass, smartcard, or key fob. In such an embodiment, when the device is within range of an associated reader and the details of the transaction have been established, the device transmits the relevant information to the receiver, including a time-limited payment card number and an expiration date for the number. In the this embodiment, the expiration date is set to the default time period established by the corresponding financial institution. For example, user device 12 selects 1 week as the timeframe for the alternate, time-limited number to expire by default. It should be understood that, because the alternate, time-limited number is transmitted by the device to the receiver, a display, such as display 24 (FIG. 1), is unnecessary in such an embodiment. It should also be understood that user device 12 may be pre-programmed to generate alternate, time-limited numbers set to expire at a fixed interval. Accordingly, an input device, such as input device 22 (FIG. 1), that allows the user to select a desired expiration timeframe or date is unnecessary in such an embodiment.

It should also be understood that financial institutions may use both known and later-developed encryption methods and processes in conjunction with the above-described embodiments. Such encryption techniques may be use in combination with the above processes without the necessity to materially alter the processes described above. Furthermore, multiple encryption techniques may be used to aid the security methods described above without departing from the scope of the present invention.

It should also be appreciated that the number generated by the process described above with respect to FIG. 2, as well as the processes described above with respect to FIGS. 4 through 7, may be used for a variety of purposes. In another embodiment, for instance, the number generated may be used as a username, password, or both in order to provide the user with access to a system, such as an online or software system. Referring again to FIG. 1, for example, server 14, which is maintained by a financial institution, may be configured to host a website. That is, medium 28 of server 14 contains computer instructions that, when executed by processing device 26, serves, hosts, or otherwise provides a website or online system that is accessible to a mobile device operated by the user, such as user device 12, via wide area network ("WAN") 34. The website may be adapted to allow users to view, manage, and interact with their respective accounts maintained by the financial institution.

In one embodiment, the website is configured as an online banking system. As should be understood, known online banking systems are adapted to request and validate a username and password supplied by the user before allowing the user to access the user's account(s) maintained by the financial institution. The online banking system may be further configured to request additional information from the user, such as the PIN associated with the user's account or the answer to one or more "secret questions" to which only the user should know the answer. Alternatively, the system may request that the user provide the PIN associated with the account rather than a password. Regardless, the user provides the requested information in order to gain access to the user's account via the online banking system. Typically, this information is static and, once compromised, can be used similarly by an unauthorized party to gain access to the user's account.

In the presently-described embodiment, the user generates a number via user device 12 in the manner described above. When prompted for the username or login id, the user provides the number to the online system hosted by server 14. The user then provides the password, PIN, or any other information requested by the system. One or more programs executed by processing device 26 of server 14 then determine if the number provided is legitimate and identify the user based on the number in a manner similar to that described above. Server 14 then determines if the number, along with the rest of the information provided by the user, such as the password, match the information stored on the server corresponding to the user's account. If so, the website provides the user with access to the user's accounts maintained by the financial institution.

In yet another embodiment, the user provides the username or login associated with the user's account to the system and then generates a number using device 12 by one of the processes described above with respect to FIGS. 2 and 4 through 7. When prompted for the password or PIN, the user provides the number generated by user device 12 to the online system. Server 14 determines if the number is legitimate and if it corresponds to the same account to which the username or login id provided by the user corresponds. If so, server 14 determines if all the information provided by the user matches the information stored by server 14 on medium 28 corresponding to the account. If so, the online system maintained by server 14 provides the user with access to the account.

It should be understood that, because the number generated by the above processes is secure, i.e., it cannot be used by an unauthorized party to determine the user's account number, it may be provided by a user without other information in order to gain access to the user's account via an online banking system. That is, any recipient or holder of the number is unable to determine the account number from the generated number, as explained above. Thus, in a preferred embodiment, the online banking system is configured to request only the number generated by user device 12. That is, the system does not request information other than the number, such as a password. In this embodiment, the user generates the number and provides it to the online system when prompted. Server 14 identifies the user and the account based on the number and determines if the number is legitimate. If so, the online banking system provides the user with access to the account. If desired, the system may provide the user with access to all accounts associated with the user maintained by the institution if server 14 identifies and authenticates the user, rather than providing access only to the account associated with the generated number.

An online banking system, such as the one provided by server 14, may be configured to accept an account number as the username or login id of the user associated with the account. If the account number is valid and corresponds to a current customer of the financial institution, the user then provides a password. As noted above, this information is typically static and can lead to unauthorized access to the user's account should the information become compromised. Therefore, such an online banking system may be configured instead to accept a number generated in the manner described above as both the user's login id and password.

In the presently-described embodiment, server 14 establishes a unique id for each account maintained by the financial institution responsible for server 14. The unique id is also stored on the user's device, such as user device 12. Although the unique id is may be any alphanumeric value of any length, it is six numeric digits in the current example so that it may be substituted for the BIN associated with the financial institution as explained in more detail below. This allows the user to enter a numeric value having the same number of digits as the user's account number but without providing the actual account number. As a result, an online banking system configured to request a user's account number as the user's login id does not need to be retrofitted to accept a non-numeric value or a value having a length for a username or id different from the length of the actual account number. For instance, the BIN of an account number is used to identify the financial institution responsible for handling a financial transaction involving the account as described above. Because the user purposefully visits the online banking system for a specific financial institution, the institution is already known. Thus, the information used to route financial transaction data to the correct entity, such as the BIN, becomes unnecessary. These digits in the generated number may be replaced with the unique id that identifies the user's account.

Accordingly, the unique id corresponding to a user's account is stored on server 14 and user device 12. The user then generates a number in a manner similar to that described above, except that the unique id is placed in the position previously reserved for the BIN. Referring to FIG. 2, for instance, the portion reserved for the BIN is filled with the unique id corresponding to the account at step 122 before being added to the PAN.

When the user visits the online banking system hosted by server 14, the user is prompted for the account number. Using device 12, the user generates a number using one of the processes described above with respect to FIGS. 2 and 4 through 7 and provides it to the system. Server 14 identifies the user based on the first six digits (which is the unique id that replaced the BIN), and then attempts to authenticate the user. That is, server 14 decodes the rest of the number using the methods described above. If server 14 authorizes and accepts the number as legitimate, the online banking system provides the user with access to the corresponding account.

In this manner, the number is arranged in order to identify and authenticate the user without substantially changing the requirements of the system maintained by the provider of the user's account. That is, if the system expects a number having a specific arrangement, such as a credit card number, a number that is time-limited, use-limited, or both may be generated exhibiting the expected arrangement. The number, however, provides the ability to identify and authenticate the user or the account and may then be discarded in order to prevent theft of fraud. It should be understood, however, that the above description also provides a manner by which a user may be uniquely identified and authenticated by an alphanumeric value of any length. That is, the generated id may comprise any amount of numeric, alphabetic, or alphanumeric digits. For example, user device 12 may generate an id for a user to access an account maintained at an entity that does not require a specific arrangement of numbers or characters. In such an embodiment, user device 12 generates an id for the user that includes a portion of alphanumeric digits identifying the user and a portion of alphanumeric digits authenticating the user. Either or both portions may then be encoded and transmitted as described above. The entity then decodes, identifies, and authenticates the user if the id is legitimate. It should be understood that portions of the id generated must be numeric in order to be encoded via the processes described above. However, it should also be understood that alphanumeric values may be used for these portions when a randomizer configured to randomize both characters and numbers is used.

In one embodiment, server 14 prevents each generated number from being reused once it has been used to access the user's account via the online banking system in a manner similar to that described above. Accordingly, if the number provided by the user to gain access to the system is compromised or stolen after it has been used, an unauthorized party is unable to reuse the number to gain access to the account via the system. In such an embodiment where each number generated may only be used once, rather than generating the portion of the number based on the timeframe the number is valid as described above with respect to FIG. 2, that portion of the number is instead based on the time at which it was generated. Thus, the portion of the number based on the point in time when the number is generated is created in the same manner as described above with respect to FIG. 2 but refers to the time of generation rather than the time of expiration. In this embodiment, server 14 maintains a list of past numbers provided by the user to access the system. In operation, when the user provides a number to server 14, the number is added to the list. Should an attempt be made to access the system using a number already included on the list, the request is denied. If such an attempt is made, server 14 may report such unauthorized access, such as notifying the user via email or alerting authorities physically located in the vicinity to where the unauthorized request originated via SMS.

In another embodiment, each number generated is associated with a timeframe during which the number is valid and may be used as set forth above. Thus, if a number generated by the user is compromised or stolen, an unauthorized party in receipt of the number is unable to use it once the timeframe has expired or lapsed. The entity maintaining the accounts corresponding to the numbers generated by device 12 has the option of whether to allow single-use numbers, time-limited numbers, or both. For instance, a digit in the number generated by user device 12 can signify which algorithm was used to encode portions of the number if desired and, therefore, can identify the algorithm that should be used by server 14 to decode the number. This includes whether to treat the number as a single-use or time-limited number.

It should be understood that the device used to access the online banking system hosted by server 14 via WAN 34 may be different from the device used to generate the number. Alternatively, the user may access the online system provided by server 14 using the same device as the one configured to generate the number, such as user device 12. In such an embodiment, user device 12 may be configured to automatically provide the generated number to the system hosted by server 14 when prompted. In another embodiment, user device 12 automatically both generates and provides the number to the system hosted by server 14 when prompted. For instance, if the system is accessed via a login webpage of a website, user device 12 automatically generates and provides the number to the login webpage when the website hosted by server 14 is accessed by the user's device.

In yet another embodiment, the user may specify a timeframe during which the number automatically provided to the system maintained by server 14 may be used. For instance, the user may instruct user device 12 to generate a number that may be used for a month to provide the user with access to the system. User device 12 then automatically provides the number to server 14 when the user attempts to access the system hosted by the server. Any attempts to access the system using the number after the timeframe has expired are denied. Additionally, the user may specify on which device the number may be used based on a unique identifier associated with the device, such as the device's IMSI. For instance, the user may instruct user device 12 to generate a number that is unique to user device 12 and that only user device 12 may use to connect to the system hosted by server 14. Thus, the relevant system denies any request to access the system using the number from a device other than the authorized device.

In another embodiment, user device 12 generates numbers configured as logins, passwords, or both in a manner similar to that described above for use with multiple systems. For example, when the user desires to gain access to a system configured to request the number, user device 12 generates and provides it to the system. When the user desires to gain access to another system, the user generates another number using device 12 and provides it to the second system. In this manner, the user may generate a unique, secure login or id for each system which identifies the user and provides access to the various systems that require authentication. Preferably, a user device 12 includes a separate module or applet corresponding to each financial institution or other entity at which the user has an account. The seed data described above is provided to the specific applet by the entity to which the applet corresponds. In such an embodiment, the user generates the number using the applet corresponding to the entity maintaining the account which the user desires to access. It should be understood that this allows each entity to additional specify the encoding and decoding algorithm or algorithms to be used.

In one embodiment, the user informs user device 12 which system the user desires to access. User device 12 then generates a number in a manner similar to that described above but unique to the system the user desires to access. That is, the number generated is associated to the identified system and may not be used to access systems or institutions other than the one identified by the user. Thus, should the number become compromised or stolen, an unauthorized party is unable to use it to gain access to systems to which the user is a member or to the user's accounts located at institutions other than the one for which the number was generated.

It should be understood that the processes described above additionally provide a method to uniquely identify and authenticate a user where such identification and authentication is necessary. Also, the number provided to identify and authenticate the user may be configured to be useable for a specific timeframe or for only one use in order to prevent fraud or identity theft. For instance, in order to receive healthcare services from a medical provider, an insured provides a number to the provider generated in a manner similar to that described above representative of and in place of the user's insurance account number. In seeking reimbursement from the user's insurance provider, the medical provider transmits the number to the insurance provider, along with information about the services rendered by the medical provider, such as the name and cost of the service. If the insurance provider identifies and authenticates the insured using the number, it reimburses the medical provider for at least a portion of the service(s) based on the insurance policy of the insured.

In this example, the number is then removed from the list of numbers available to identify and authenticate the user and the user's insurance account. As a result, an attempt to engage in insurance fraud or identity theft using the number provided by the insured is thwarted. For instance, if the medical provider attempts to receive a reimbursement for services it falsely states were provided to the insured using the number previously provided to the insurance provider, the number is unusable and indicates that the medical provider is attempting to receive reimbursements to which it is not entitled. Server 14 may alert the insurance provider, which may instigate an investigation into the medical provider's actions. Additionally, should an unauthorized party attempt to receive healthcare services from the medical provider using the number previously provided by the insured, the number is unusable, and the insurance provider alerts the medical provider of this fact and suggests that the provider investigate the individual attempting to use it.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method for providing access to a first account maintained by an institution, wherein the first account is associated by the institution with an account number and with a first user, an identifier that is unique to the first account among accounts that the institution maintains that are accessible at a computer by users remote from the computer via a wide area network, and authentication data associated with the first user that the institution requires to be submitted to the institution as a condition to grant access to the first account, the method comprising the steps of:

generating by a mobile device a login credential according to a predetermined algorithm so that the login credential is different from the account number, has a same number of digits as the account number, and includes a first set of digits corresponding to the identifier and a second set of digits corresponding to the authentication data;

transmitting the login credential from the mobile device to the computer via the wide area network;

identifying the first account based upon the first set of digits of the login credential transmitted at the transmitting step;

authenticating the user of the first account identified at the identifying step based upon the second set of digits of the login credential transmitted at the transmitting step; and in response to confirmation by the institution that the login credential received by the computer from the transmitting step corresponds to the identifier and to the authentication data, interacting with the first account from the mobile device via the wide area network and the computer.

2. The method as in claim 1, wherein the computer is a server.

3. The method as in claim 2, wherein the authentication data is a private identification number defined by the institution.

4. The method as in claim 2, wherein the authentication data is a private identification number defined by the first user.

5. A method for providing access to an account from a remote device, comprising the steps of:

associating, at a computer, a first account with
an identifier that is unique to the first account among accounts that an institution maintains that are accessible at the computer via a wide area network by users remote from the computer,
an account number,
a first user of the first account, and
authentication data corresponding to the first user;

generating by a mobile device a login credential according to a predetermined algorithm so that the login credential is different from the account number, has a same number of digits as the account number, and includes a first set of digits corresponding to the identifier and a second set of digits corresponding to the authentication data;

transmitting the login credential from the mobile device to the computer via the wide area network; and at the computer,
receiving the login credential,
identifying the first account based upon the first set of digits of the login credential,
authenticating the user of the first account identified at the identifying step based upon the second set of digits of the login credential, and
in response to identification of the first account at the identifying step and authentication of the user of the first account at the authenticating step, permitting the mobile device to interact with the first account via the wide area network and the computer.

6. The method as in claim 5, wherein,
the associating step comprises associating the first account with an expiration, and
at the generating step, the login credential is generated according to the predetermined algorithm so that the login credential has a third set of digits that corresponds to data identifying a time that is earlier than the expiration.

7. The method as in claim 6, further comprising the step, at the computer following the receiving step, of determining whether the login credential received at the receiving step was received after the time, and wherein the permitting step is performed in response to the determining step.

8. The method as in claim 5, wherein the computer is a server.

9. The method as in claim 8, wherein the authentication data is a private identification number defined by the institution.

10. The method as in claim 8, wherein the authentication data is a private identification number defined by the first user.

11. A method for providing access to a first account maintained by an institution, wherein the first account is associated by the institution with an account number and with a first user, an identifier that is unique to the first account among accounts that the institution maintains that are accessible at a server by users via a wide area network, and authentication data associated with the first user that the institution requires to be submitted to the institution as a condition to grant access to the first account, the method comprising the steps of:
generating by a mobile device a login credential according to a predetermined algorithm so that the login credential is different from the account number, has a same number of digits as the account number and includes a first set of digits corresponding to the identifier and a second set of digits corresponding to the authentication data;
transmitting the login credential from the mobile device to the server via the wide area network; and
in response to confirmation by the institution that the login credential received by the institution from the transmitting step corresponds to the identifier and to the authentication data, interacting with the first account from the mobile device via the wide area network and the server,
wherein neither the identifier nor the authentication data includes or is defined by any data transmitted to the server with or in association with the transmitting step other than data that comprises the login credential.

12. The method as in claim 11, wherein the authentication data is a private identification number defined by the institution.

13. The method as in claim 11, wherein the authentication data is a private identification number defined by the first user.

14. The method as in claim 11, wherein the confirmation is based only on the login credential transmitted to the server at the transmitting step.

15. A method for providing access to a first account maintained by an institution, wherein the first account has a predetermined expiration and is associated by the institution with an account number and with a first user, an identifier that is unique to the first account among accounts that the institution maintains that are accessible at a server by users via a wide area network, and authentication data that the institution requires to be submitted to the institution as a condition to grant access to the first account, the method comprising the steps of:
generating by a mobile device a login credential according to a predetermined algorithm so that the login credential is different from the account number, has a same number of digits as the account number and includes a first set of digits corresponding to the identifier, a second set of digits corresponding to the authentication data, and a third set of digits corresponding to data identifying a time that is earlier than the expiration of the first account;
transmitting the login credential from the mobile device to the server via the wide area network; and
in response to confirmation by the institution that the login credential received by the server from the transmitting step corresponds to the identifier and to the authentication data, interacting with the first account from the mobile device via the wide area network and the server,
wherein neither the identifier nor the authentication data includes or is defined by any data transmitted to the server with or in association with the transmitting step other than data that comprises the login credential.

16. The method as in claim 15, wherein the time data corresponds to an expiration date of the login credential, and wherein the interacting step occurs further in response to confirmation by the institution that the login credential received by the server from the transmitting step was received after the time.

17. The method as in claim 15, wherein the time data corresponds to a time at which the login credential is generated.

18. The method as in claim 15, wherein the authentication data is a private identification number defined by the institution.

19. The method as in claim 15, wherein the authentication data is a private identification number defined by the first user.

20. The method as in claim 15, wherein the confirmation is based only on the login credential transmitted to the server at the transmitting step.

21. A method for providing access to an account from a remote device, comprising the steps of:
associating, at a server, a first account with
an identifier that is unique to the first account among accounts that an institution maintains that are accessible at the server via a wide area network by users remote from the server,
an account number,
a first user of the account, and
authentication data corresponding to the first user;
generating by a mobile device a login credential, that is different from the account number, according to a predetermined algorithm so that the login credential has a same number of digits as the account number and includes a first set of digits corresponding to the identifier and a second set of digits corresponding to the authentication data;
transmitting the login credential from the mobile device to the server via the wide area network; and
at the server,
receiving the login credential,
identifying the first account in response to the first set of digits of the login credential,
authenticating the user in response to the second set of digits of the login credential, and in response to identification of the first account at the identifying step and authentication of the user at the authenticating step, permitting the mobile device to interact with the first account via the wide area network and the server, wherein neither the identifier nor the authentication data includes or is defined by any data transmitted to the server with or in association with the transmitting step other than data that comprises the login credential.

22. The method as in claim 21, wherein, the associating step comprises associating the first account with an expiration, and at the generating step, the login credential is generated according to the predetermined algorithm so that the login credential has a third set of digits that corresponds to data identifying a time that is earlier than the expiration.

23. The method as in claim 22, further comprising the step, at the server following the receiving step, of determining whether the login credential received at the receiving step was received after the time, and wherein the permitting step is performed in response to the determining step.

24. The method as in claim 21, wherein the authentication data is a private identification number defined by the institution.

25. The method as in claim 21, wherein the authentication data is a private identification number defined by the first user.

26. The method as in claim 21, wherein the confirmation is based only on the login credential transmitted to the server at the transmitting step.

* * * * *